(12) United States Patent
Charmensat et al.

(10) Patent No.: US 8,687,760 B2
(45) Date of Patent: Apr. 1, 2014

(54) METHOD OF DETERMINING AT LEAST ONE TECHNOLOGICAL UNCERTAINTY FACTOR FOR NUCLEAR FUEL ELEMENTS, AND CORRESPONDING METHODS OF DESIGNING, FABRICATING, AND INSPECTING NUCLEAR FUEL ELEMENTS

(71) Applicant: Areva NP, Courbevoie (FR)

(72) Inventors: Pascal Charmensat, Caluire (FR); Michel Pasquet, Villette d'Anthon (FR)

(73) Assignee: Areva NP, Courbevoie (FR)

( * ) Notice: Subject to any disclaimer, the term of this patent is extended or adjusted under 35 U.S.C. 154(b) by 0 days.

(21) Appl. No.: 13/692,560

(22) Filed: Dec. 3, 2012

(65) Prior Publication Data

US 2013/0177121 A1 Jul. 11, 2013

Related U.S. Application Data

(63) Continuation of application No. 11/991,712, filed as application No. PCT/FR2006/001965 on Aug. 21, 2006, now abandoned.

(30) Foreign Application Priority Data

Sep. 9, 2005 (FR) ...................................... 05 09228

(51) Int. Cl.
*G21C 3/00* (2006.01)

(52) U.S. Cl.
USPC ............................................ 376/409; 376/245

(58) Field of Classification Search
USPC ..................................................... 376/245, 405
See application file for complete search history.

(56) References Cited

FOREIGN PATENT DOCUMENTS

JP 2001-99976 4/2001

OTHER PUBLICATIONS

Coors D et al, "Auswirkungen von brennstofftoleranzen auf die betriebsdaten eines schnellen reaktors" Journal of Nuclear Materials Netherlands vol. 106, No. 1-3, Apr. 1982 pp. 253-259, XP002383087, ISSN 0022-3115.*

* cited by examiner

*Primary Examiner* — Timothy A Brainard
(74) *Attorney, Agent, or Firm* — Davidson, Davidson & Kappel, LLC (57) ABSTRACT

The invention relates to a method of determining at least one technological uncertainty factor in respect of nuclear fuel elements (23) as a function of variations in the production parameters of the elements (23) in relation to nominal values. The inventive method comprises a step involving the use, for at least one production parameter, of a collective variation in said parameter in relation to the nominal value within a batch of produced elements (23). The invention can be used, for example, to design, produce and check pellets for light water reactors.

12 Claims, 3 Drawing Sheets

METHOD OF DETERMINING AT LEAST ONE TECHNOLOGICAL UNCERTAINTY FACTOR FOR NUCLEAR FUEL ELEMENTS, AND CORRESPONDING METHODS OF DESIGNING, FABRICATING, AND INSPECTING NUCLEAR FUEL ELEMENTS

This is a continuation of U.S. application Ser. No. 11/991,712 filed Mar. 7, 2008, which is hereby incorporated by reference herein, and claims priority to French Patent Application FR 05 09228, which is hereby incorporated by reference herein.

The present invention relates to a method of determining technological uncertainty factors.

BACKGROUND OF THE INVENTION

The invention applies by way of example, but not exclusively, to the nuclear fuel used in light water reactors, such as pressurized water reactors.

The nuclear fuel used in such reactors is conditioned in the form of pellets.

These pellets are placed in cladding to form nuclear fuel rods that are grouped together within assemblies. Such assemblies are for loading in the cores of nuclear reactors.

In order to fabricate nuclear fuel pellets, nominal values and individual tolerances are set for fabrication parameters. In fabricated pellets, the real values of these fabrication parameters necessarily vary from one pellet to another relative to the nominal value, and for each pellet these values are required to comply with selected fabrication tolerances.

The design of fuel pellets is subject to imperative safety rules of the kind that characterize the entire nuclear industry.

In this context, it is appropriate to make effective use of fissile material, while requiring the manufacturer to comply with specifications that are pertinent, and while also presenting the operator with operating conditions that are flexible.

Satisfying these objectives requires detailed knowledge about the behavior of the nuclear fuel and requires inspection of the variations that necessarily occur in fabrication relative to nominal values for fabrication parameters.

The parameters characterizing nuclear fuel pellets are too numerous to enable them to be taken into account directly when performing safety studies.

Neutron calculations implemented in such safety studies are therefore performed using nominal values, and the variations relative to these values are taken into account by means of multiplier coefficients that are referred to as technological uncertainty factors and that are applied to the results of the neutron calculations.

Use is made in particular of the technological uncertainty factor for the linear power density at the hot point $F_Q^E$ as defined below.

For a given nuclear reactor, core safety requires the linear power density of the hottest rod (power peak) to remain at all times below the limit set for reactor safety. It is therefore appropriate to ensure that the linear power density of the hottest rod, as calculated using fabrication parameters at their nominal values and then increased by the factor $F_Q^E$ remains below said limit.

In the past, the factor $F_Q^E$ has been calculated fabrication parameter by fabrication parameter, taking into consideration the permitted value that maximizes linear power density, and even though certain compensation phenomena exist. Furthermore, the uncertainty in that calculation is such that it does not enable different variations to be compared.

To evaluate uncertainties better, and thus make it possible to give flexibility to the nuclear fuel manufacturer or to the reactor operator, or indeed to relax constraints so as to increase the performance of the nuclear fuel, proposals have been made to take account of the random nature of fabrication variations by relying on the generalized and conventional perturbation theory (GCPT).

That method of determining the factor $F_Q^E$ is described, for example, in the Ph.D. thesis presented to Université Claude Bernard—Lyon I, by Guy Willermoz, defended on Sep. 28, 1994 before the Examination Commission and entitled "Etude stochastique de l'impact neutronique des hétérogénéités en fabrication du combustible nucléaire" [A stochastic study of the neutron impact of fabrication non-uniformities in nuclear fuel].

That method makes it possible to quantify the influence of each fabrication parameter on the core state of a nuclear reactor. It was developed by analyzing variations in fabrication parameters in a fuel based on a mixture oxide fuel (MOX).

For this purpose, a probability relationship is associated with different variations in the fabrication parameters of pellets. By using statistical studies to estimate the combined relationship of the fabrication parameters, the influence thereof on the point power relationship can be studied by using Boltzmann's equation.

The stochastic Taylor development was used, with sensitivity coefficients in a multi-parameter context being calculated using the generalized and conventional perturbation theory (GCPT).

Thus, in that prior art method, account is taken of individual variations in the fabrication parameters, i.e. variations from pellet to pellet by multiplying them by sensitivity coefficients that are said to be "microscopic" since they apply to individual variations only. The individual variations taken into account may be the tolerances that each pellet is required to comply with.

That method of determining the technological uncertainty factor $F_Q^E$ has been found to be satisfactory.

Nevertheless, it would be desirable to further improve the determination of technological uncertainty factors such as $F_Q^E$ and thus to increase flexibility for the nuclear fuel manufacturer or for the nuclear reactor operator.

OBJECTS AND SUMMARY OF THE INVENTION

For this purpose, the invention provides a method of determining at least one technological uncertainty factor for nuclear fuel elements as a function of variations in fabrication parameters of the elements about nominal values, the method comprising a step of making use, for at least one fabrication parameter, of collective variation in said parameter about the nominal value within a batch of fabricated elements.

According to other particular implementations, the method may include one or more of the following characteristics taken in isolation or in any technically feasible combination:

for at least one parameter, and in addition to said collective variation, use is also made of individual variation in the parameter about the nominal value for an individual element;

the technological uncertainty factor is determined for linear power density at the hot point $F_Q^E$;

the technological uncertainty factor is determined for the hot channel $F_{\Delta H}^{E1}$;

the collective variation is multiplied by a macroscopic sensitivity coefficient and optionally the individual variation is multiplied by a microscopic sensitivity coefficient;

use is made of a formula of the type:

$$F_Q^E = 1 + \frac{1.645}{1.96}\sqrt{\sum_i \left(\alpha_i^2 \frac{T_i^2}{\mu_i^2} + \theta_i^2 \frac{TL_i^2}{\mu_i^2}\right)}$$

where $T_i$ and $TL_i$ respectively designate individual and collective variations in a fabrication parameter Figure, where $\alpha_i$ and $\theta_i$ respectively designate the microscopic and macroscopic sensitivity coefficients for the fabrication parameter, and where $\mu_i$ designates the mean for the fabrication parameter $F_i$;

use is made of a formula of the type:

$$F_{\Delta H}^{E1} = 1 + \frac{1.645}{1.96}\sqrt{\sum_i \left(\alpha_i^2 \frac{TL_i^2}{\mu_i^2} + \theta_i^2 \frac{TL_i^2}{\mu_i^2}\right)}$$

where $TL_i$ designates the collective variation in a fabrication parameter $F_i$, where $\alpha_i$ and $\theta_i$ designate respectively the microscopic and the macroscopic sensitivity coefficients in the fabrication parameter, and where $\mu_i$ designates the mean for the fabrication parameter $F_i$; and the collective variation is a collective tolerance, the deviation between the mean of the real values for the fabrication parameter within a batch of elements and its nominal value being required to comply with said collective tolerance, and in which, optionally, the individual variation is an individual tolerance, the deviation between the real value of the fabrication parameter for an individual element and its nominal value needing to comply with the individual tolerance.

The invention also provides a method of designing a nuclear fuel element, the method including a step of using a method of determining at least one technological uncertainty factor as defined above.

In a variant, for a nuclear fuel element that is to comply with a limit value for at least one technological uncertainty factor, the method comprises the steps of:

defining a collective fabrication tolerance at least for said fabrication parameter, the deviation between the mean of the real values of said parameter in a batch of fabricated elements and the nominal value of said parameter being required to comply with the collective tolerance;

optionally defining an individual fabrication tolerance at least for said fabrication parameter, the individual deviation between the real value of the fabrication parameter for an individual element and the nominal value of said parameter for a fabricated element and the nominal value for said parameter being required to comply with the individual tolerance; and determining the value of said technological uncertainty factor using a method as defined above, using as collective variation the defined collective fabrication tolerance, and optionally as individual variation the defined individual tolerance; and comparing the determined value of the technological uncertainty factor with the limit value for validating the defined fabrication tolerances.

The invention also provides a method of fabricating nuclear fuel elements designed by a method as defined above.

The invention also provides a method of inspecting fabricated nuclear fuel elements, the method comprising the steps of:

using a method as defined above for determining the value of at least one technological uncertainty factor for the fabricated nuclear fuel elements, using as collective variation the deviation between a mean of real values of said parameter as measured in a batch of fabricated elements and the nominal value of said parameter, and optionally as individual variation the deviation between a real value actually measured on a fabricated element and the nominal value of said parameter; and making a comparison with a limiting value for the technological uncertainty factor that the nuclear fuel elements are required to comply with in order to make a decision about the fabricated nuclear fuel elements.

BRIEF DESCRIPTION OF THE DRAWINGS

The invention can be better understood on reading the following description given purely by way of example and made with reference to the accompanying figures, in which.

MORE DETAILED DESCRIPTION

Figure 1:
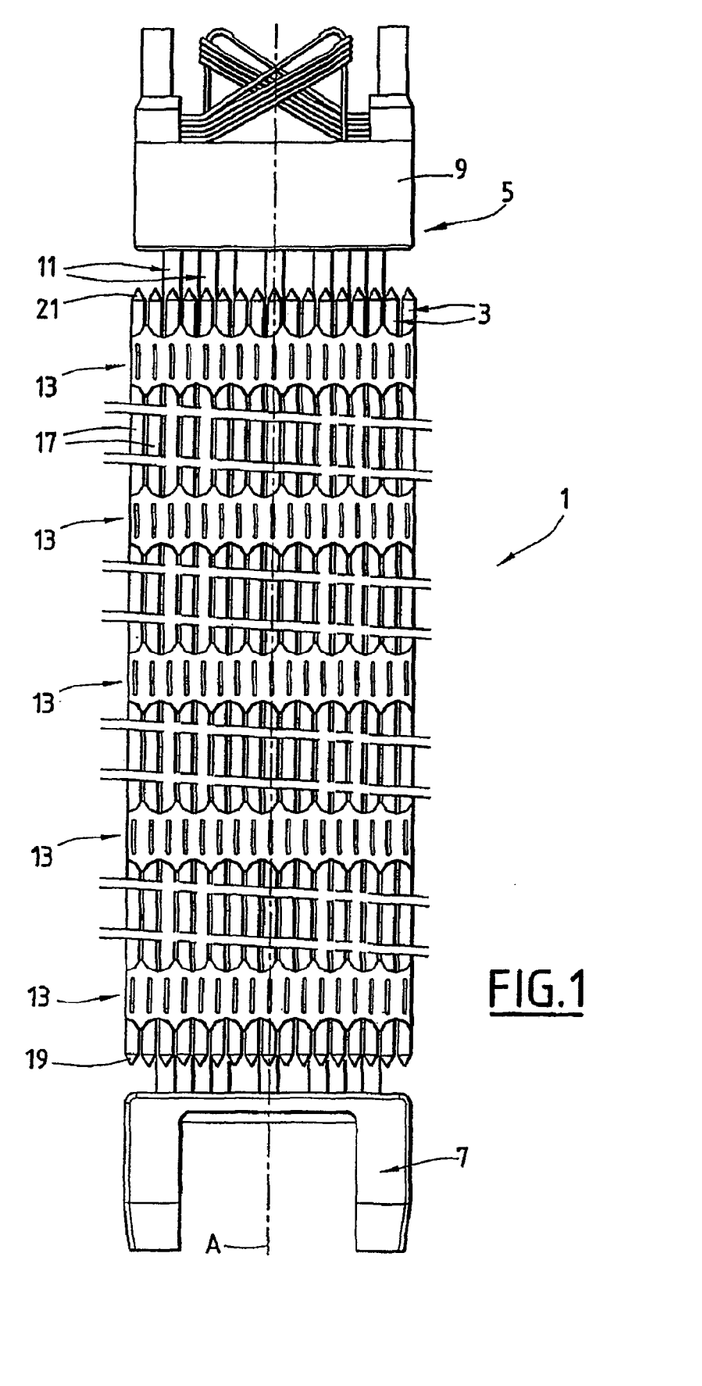
FIG. 1 is a diagrammatic side view of a nuclear fuel assembly for a pressurized water reactor.

FIG. 1 is a diagram showing a nuclear fuel assembly 1 for a pressurized water reactor. Water thus performs therein both a refrigeration function and a moderation function, i.e. it slows down neutrons produced by the nuclear fuel.

The assembly 1 extends vertically and in rectilinear manner along a longitudinal direction A.

In conventional manner, the assembly 1 mainly comprises nuclear fuel rods 3 and a structure or skeleton 5 for supporting the rods 3.

The support skeleton 5 comprises:

a bottom nozzle 7 and a top nozzle 9 placed at the longitudinal ends of the assembly 1;

guide tubes 11 for receiving the rods of a cluster (not shown) for controlling and stopping the nuclear reactor; and grids 13 for holding the rods 3.

The nozzles 7 and 9 are connected to the longitudinal ends of the guide tubes 11.

The rods 3 extend vertically between the nozzles 7 and 9. The rods 3 are disposed at the nodes of a substantially regular square-mesh array in which they are held by the grids 13. Some of the nodes of the array are occupied by the guide tubes 11, and possibly by an instrumentation tube.

Figure 2:
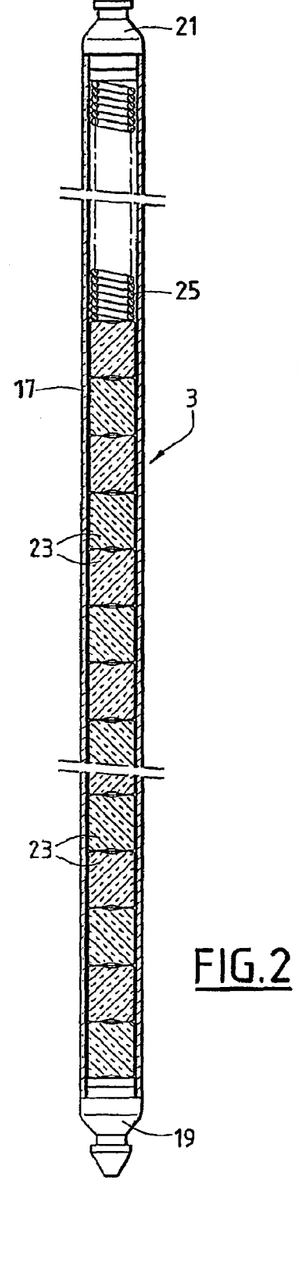
FIG. 2 is a diagrammatic longitudinal section of a rod of the FIG. 1 assembly.

As shown in FIG. 2, each rod 3 comprises outer cladding 17 closed by a bottom plug 19 and a top plug 21, and containing the nuclear fuel.

A helical retention spring 25 is placed in the cladding 17 between the top pellet 23 and the top plug 21.

Figure 3:
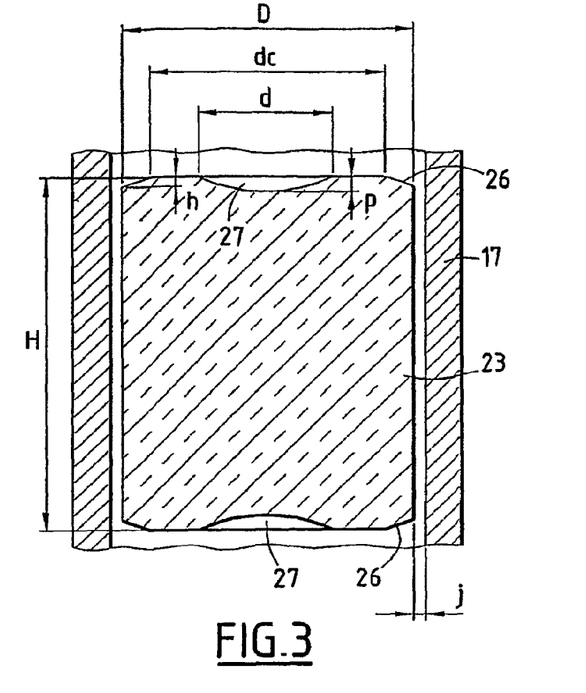
FIG. 3 is a diagrammatic fragmentary view on a larger scale showing the shape of a pellet of the FIG. 2 rod.

As shown in FIG. 3, each pellet 23 is substantially cylindrical in shape having diameter D and height H. The pellet 23 presents chamfers 26 between its end faces and its side face.

These chamfers are of height h and of inside diameter dc. A recess 27 in the form of a spherical cap is formed in each end face, substantially in the center thereof. It is of diameter d and of depth p.

The height/diameter ratio H/D may be arbitrary, for example about 1.6, but it could equally well be smaller, e.g. about 0.5.

Diametral clearance j, e.g. lying in the range 100 micrometers (μm) to 300 μm, is provided between the pellets 23 and the cladding 17.

By way of example, the fuel of the pellets 23 is constituted by uranium oxide (natural $UO_2$) that is enriched in isotope 235. In a variant, the fuel may equally well be based on enriched retreated uranium, a mixture of uranium and plutonium oxides, and/or it may contain neutron poisons based on rare earth (gadolinium, erbium).

After being fabricated, a pellet 23 is defined by a series of characteristics that are common to all types of pellet, i.e. whether based on enriched natural uranium (ENU), enriched reprocessed uranium (ERU), mixed oxide (MOX), or containing neutron poisons such as gadolinium oxide.

These characteristics are as follows:
the dimensions of the pellet, i.e. the height H and the diameter D of the pellet 23, the depth p and the diameter d of the recesses 27, the height h and the diameter dc of the chamfers 26; and
its geometrical density Dg.

The geometrical density Dg of the pellet is defined as being the ratio of its oxide mass in ceramic form to its theoretical oxide mass.

Variation in any of these characteristics leads to variation in volume and thus to the quantity of fissile material contained in the pellet 23.

Definition of the Fabrication Parameters Taken into Account

In the implementation of the invention described below, variations in the fabrication of these characteristics are taken into account when performing neutron calculations by using the following fabrication parameters:
volume fraction Fv, which is the ratio between the volume of the pellet 23 and the volume of the enveloping cylinder, this fraction thus taking account of the dimensions of the recesses 27 and of the chamfers 26;
diameter D; and
geometrical density Dg.

These fabrication parameters apply to pellets regardless of the type of nuclear fuel, and they are thus referred to below as being generic.

Other fabrication parameters can also be taken into account specifically for different types of pellet.

For ENU pellets, it is possible to use the content of isotope $^{235}U$, also known as the enrichment e, which is defined as:

$$e = \frac{\text{mass}(^{235}U)}{\text{mass}(^{235}U + ^{238}U)}$$

For ENU pellets containing gadolinium, it is possible to use the enrichment es of the uranium support:

$$es = \frac{\text{mass}(^{235}U)}{\text{mass}(^{235}U + ^{238}U)}$$

For these pellets, it is also possible to use the gadolinium oxide content t which is defined as the ratio of $Gd_3O_3$ to the total mass of $UO_2$ plus $Gd_2O_3$:

$$t = \frac{\text{mass}(Gd_2O_3)}{\text{mass}(UO_2 + Gd_2O_3)}$$

where Gd=($^{154}Gd$, $^{155}Gd$, $^{156}Gd$, $^{157}Gd$, $^{158}Gd$, $^{160}Gd$) and U=($^{235}U$, $^{238}U$) of the uranium support.

To characterize the gadolinium in these pellets, it is also possible to take account of the isotope composition CI which at a given instant is defined by:

$$CI = \frac{\text{mass (isotope } i)}{\sum_i \text{mass (isotope } i)}$$

In this formula, account is taken of the following isotopes: $^{154}Gd$, $^{155}Gd$, $^{156}Gd$, $^{157}Gd$, $^{158}Gd$, $^{160}Gd$.

Nevertheless, the isotope composition is generally the same as that of natural gadolinium. The fuel manufacturer thus does not induce any variability in this composition CI and the isotope composition of gadolinium is therefore not taken into account in the example described below.

Concerning ERU pellets, account can be taken of the following isotopes of uranium: $^{234}U$, $^{235}U$, $^{236}U$, and $^{238}U$.

The isotopes $^{234}U$, $^{235}U$, and $^{236}U$ are characterized by their own concentrations also referred to as enrichment. These fabrication parameters are defined as follows:

$$e_4 = \frac{\text{mass }(^{234}U)}{\text{mass }(^{234}U + ^{235}U + ^{236}U + ^{238}U)}$$

$$e_5 = \frac{\text{mass }(^{235}U)}{\text{mass }(^{234}U + ^{235}U + ^{236}U + ^{238}U)}$$

$$e_6 = \frac{\text{mass }(^{236}U)}{\text{mass }(^{234}U + ^{235}U + ^{236}U + ^{238}U)}$$

For MOX pellets, account can be taken of the following specific fabrication parameters:

Enrichment of the uranium support es:
two isotopes can be taken into account to characterize the uranium support:
$^{235}U$ and $^{238}U$ The enrichment es is then defined by:

$$es = \frac{\text{mass }(^{235}U)}{\text{mass }(^{235}U + ^{238}U)}$$

The plutonium isotope composition CI:
six isotopes be taken into account to characterize plutonium: $^{238}Pu$, $^{239}Pu$, $^{240}Pu$, $^{241}Pu$, $^{242}Pu$ and $^{241}Am$ which is obtained by $\beta^-$ disintegration of $^{241}Pu$ with a period of 14.4 years.

At a given instant, the isotope composition CI is thus defined by:

$$CI_j = \frac{\text{mass (isotope Pu}_j)}{\sum_j \text{mass (isotope Pu}_j)}$$

Plutonium content t (or total plutonium content) defined by:

$$t = \frac{\text{mass (Pu + }^{241}\text{Am)}}{\text{mass (U + Pu + }^{241}\text{Am)}}$$

where Pu=($^{238}$Pu, $^{239}$Pu, $^{240}$Pu, $^{241}$Pu, $^{242}$Pu) and U=($^{235}$U, $^{238}$U).

Fissile plutonium content $t_{fis}$:

$$t_{fis} = \frac{\text{mass (}^{239}\text{Pu + }^{241}\text{Am)}}{\text{mass (U + Pu + }^{241}\text{Am)}}$$

where Pu=($^{238}$Pu, $^{239}$Pu, $^{240}$Pu, $^{241}$Pu, $^{242}$Pu) and U=($^{235}$U, $^{238}$U).

In the implementation of the invention that is described, the above-defined generic and specific fabrication parameters are those taken into account in order to verify that a given nuclear fuel complies with safety requirements. These fabrication parameters are designated below generically by $F_i$.

The nuclear fuel is modeled by using nominal values $F_{i0}$ for the fabrication parameters $F_i$.

As mentioned above, the variations about these nominal values, which variations are inevitable during fabrication, are then taken into account by means of uncertainty coefficients that penalize the results of the calculation, referred to as: technological uncertainty factors.

Definition of Technological Uncertainty Factors

These factors apply to calculating the hot point factor $F_Q$ and the enthalpy rise factor $F_{\Delta H}$ in safety studies.

The hot point is the rod of a core that has the greatest power. Below, it is sometimes referred to as the hot rod or located as being the power peak.

In France, there are generally two technological uncertainty factors:

The first is the technological uncertainty factor for linear power density at the hot point $F_Q^E$.

It is defined as follows:

$$F_Q^E = \left(\frac{P_{max}}{P_{nom}}\right)_{hot\ point}$$

with $P_{max}$: maximum value of the linear power density at the hot point taking account of variations associated with fabrication; and $P_{nom}$: linear power density calculated at the hot point with the nominal fabrication values $F_{i0}$.

As mentioned above, the linear power density depends on pellet-to-pellet variations in the following fabrication parameters $F_i$:
 volume fraction Fv;
 diameter D;
 geometrical density Dg;
 enrichment e for ENU pellets and enrichments $e_4$, $e_5$, and $e_6$ for ERU pellets;
 plutonium isotope composition CI, $^{235}$U enrichment of the uranium support es, plutonium content t for MOX pellets; and
 uranium support enrichment es and gadolinium content t in the presence of rods containing gadolinium.

The second factor is the technological uncertainty factor of the hot channel $F_{\Delta H}^{E1}$.

It is defined by:

$$F_{\Delta H}^{E1} = \left(\frac{\Delta H_{max}}{\Delta H_{nom}}\right)_{hot\ channel}$$

with $\Delta H_{max}$: maximum value for enthalpy rise in the hot channel due to fabrication variations;

and $\Delta H_{nom}$: calculated enthalpy rise in the hot channel calculated using nominal fabrication values $F_{i0}$.

The hot channel is the channel, i.e. the gap between adjacent fuel rods, in which enthalpy variation is the greatest. It is generally situated beside the hot rod.

Enthalpy rise depends on rod-to-rod variations in the following parameters:
 volume fraction Fv;
 diameter D;
 geometrical density Dg;
 enrichment e for ENU pellets and enrichments $e_4$, $e_5$, and $e_6$ for ERU pellets;
 plutonium isotope composition CI, $^{235}$U enrichment es of uranium, plutonium content t for MOX; and
 enrichment of the uranium support es and gadolinium content t in the presence of rods containing gadolinium.

Determining Technological Uncertainty Factors

There follows a description of the method of determining technological uncertainty factors.

We have:

$$F_Q^E = \frac{P_{max}}{P_0} = \frac{P_0 + \delta P_{max}}{P_0} = 1 + \frac{\delta P_{max}}{P_0}$$

If it is assumed that the variable P is distributed with a normal distribution, then the variable $\delta P/P_0$ is likewise distributed with a normal distribution that is characterized by an average of zero and a standard deviation of $\sigma$. 95% of the values of $\delta P/P_0$ are less than 1.645$\sigma$ with a confidence index of 95%, considering unilateral dispersion.

This gives $F_Q^E = 1 + 1.645\sigma$, which can also be written:

$$F_Q^E = 1 + 1.645\sqrt{\text{variance}\left(\frac{\delta P_{max}}{P_0}\right)}$$

The technological uncertainty factors of the pertinent magnitude are determined from formulae for the sensitivity of the pertinent magnitude (maximum linear power density or maximum enthalpy rise) to the fabrication parameters $F_i$ of the nuclear fuel under consideration.

For small variations in the various fabrication parameters $F_i$ about the nominal values $F_{i0}$, it is possible to express the impact of variation in fabrication parameters on the pertinent magnitude with the help of sensitivity formulae of the type:

$$\frac{\delta P}{P_o} = \sum_i \lambda_i \frac{\delta F_i}{F_{io}}$$

where $\delta P/P_0$ is the relative variation in the magnitude of the hot point, $\delta F_i/F_{i0}$ designates relative variations in each fabrication parameter $F_i$, and $\lambda_i$ designates the power sensitivity coefficients.

It is assumed that the variations in the various fabrication parameters $F_i$ are mutually independent, and distributed with normal distributions of mean $\mu_i$ and standard deviation $\sigma_i$. The variance of $\delta F_i/F_{i0}$ is then equal to the variance $F_i$ divided by the square of the mean for $F_i$: $(\sigma_i/\mu_i)^2$.

The variability of the deviation of the pertinent magnitude at the hot point is then distributed with a normal distribution characterized by variance such that:

$$\mathrm{var}\left(\frac{\delta P}{P_o}\right) = \sum_i \lambda_i^2 \frac{\sigma_i^2}{\mu_i^2}$$

In considering the linear power density at the hot point for P, the value of the first technological uncertainty factor $F_Q^E$ is such that 95% of the local variations in linear power are less than:

$$F_Q^E = 1 + 1.645 \sqrt{\mathrm{var}\left(\frac{\delta P_{lin}}{P_{lin}}\right)}$$

In considering the enthalpy rise in the hot channels of P, the value $F_{\Delta H}^{E1}$ is such that 95% of the enthalpy rise variations are less than:

$$F_{\Delta H}^{E1} = 1 + 1.645 \sqrt{\mathrm{var}\left(\frac{\delta \Delta H}{\Delta H}\right)}$$

Two types of sensitivity formula are calculated depending on whether it is considered that the deviation of the fabrication parameter applies to the hot rod, with the other rods of the assembly to which it belongs being unaffected (microscopic sensitivity formula), or to all of the assembly to which it belongs (macroscopic sensitivity formula):

$$\frac{\delta P}{P_o} = \sum_i \alpha_i \frac{\delta F_i}{F_{io}}$$

$$\mathrm{var}\left(\frac{\delta P}{P_o}\right) = \sum_i \alpha_i^2 \frac{\sigma_i^2}{\mu_i^2}$$

with $\alpha_i$: microscopic sensitivity coefficients.

$$\frac{\delta P}{P_o} = \sum_i \theta_i \frac{\delta F_i}{F_{io}}$$

$$\mathrm{var}\left(\frac{\delta P}{P_o}\right) = \sum_i \theta_i^2 \frac{\sigma_i^2}{\mu_i^2}$$

with $\theta_i$: macroscopic sensitivity coefficients.

The coefficients $\alpha_i$ and $\theta_i$ can be calculated for different burnups of the fuel, as described below. $\mu_i$ can be measured or approximated as described below.

Contrary to prior art methods, account is taken here of macroscopic variability of the fabrication parameters. It is also possible to take account of microscopic variability of said fabrication parameters.

For each of the fabrication parameters $F_i$ under consideration when calculating technological uncertainty factors, an estimate with a confidence level of 95% for the maximum value of its effect in terms of overall power is given by a quadratic accumulation of the estimates, with 95% confidence level, for the maximum values of the mean and local power effects.

This gives:

$$F_Q^E = 1 + \sqrt{(1 - F_Q^E \mathrm{micro})^2 + (1 - F_Q^E \mathrm{macro})^2}$$

For a fabrication parameter $F_i$, the fabrication tolerance $T_i$ is then defined in such a manner that 95% of the pellets lie in the range $F_{i0} \pm T_i$ about the nominal value $F_{i0}$. If $F_i$ is distributed with a normal distribution of mean $\mu_i$ and a standard deviation of $\sigma_i$, then:

$$\sigma_i \leq \frac{T_i}{1.96}$$

To calculate the first technological uncertainty factor $F_Q^E$, the following are taken into consideration:
  individual variations, i.e. from pellet to pellet, in the fabrication parameters $F_i$ in order to determine the effect in terms of local power; and
  collective variations in the fabrication parameters $F_i$, i.e. for example, variations from fabrication batch to fabrication batch, in order to determine the effect in terms of mean power.

The individual tolerances $T_i$ of the pellets are thus used for microscopic effects, and the mean tolerances $TL_i$ of a batch of pellets are used for the macroscopic effects:

$$\text{with } F_Q^E \mathrm{micro} = 1 + \frac{1.645}{1.96}\sqrt{\sum_i \alpha_i^2 \frac{T_i^2}{\mu_i^2}}$$

$$\text{and } F_Q^E \mathrm{macro} = 1 + \frac{1.645}{1.96}\sqrt{\sum_i \theta_i^2 \frac{TL_i^2}{\mu_i^2}}$$

$$F_Q^E = 1 + \sqrt{(1 - F_Q^E \mathrm{micro})^2 + (1 - F_Q^E \mathrm{macro})^2}$$

This calculation is identical to that which consists in calculating an individual technological factor $F_Q^E(i)$ for each fabrication parameter $F_i$ and then in accumulating them in order to obtain the overall $F_Q^E$.

$$F_Q^E(i) = 1 + \frac{1.645}{1.96}\sqrt{\sum_i \alpha_i^2 \frac{T_i^2}{\mu_i^2} + \sum_i \theta_i^2 \frac{TL_i^2}{\mu_i^2}}$$

The overall technological uncertainty factor $F_Q^E$ is then:

$$F_Q^E = 1 + \sqrt{\sum_i (1 - F_Q^E(i))^2}$$

To calculate the second technological uncertainty factor $F_{\Delta H}^{E1}$, identical formulae are used when determining the effect in terms of local power and the effect in terms of mean power, but only collective variations of fabrication parameters are taken into consideration, i.e., for example, variations within a single fabrication batch. Only the mean tolerances $TL_i$ of a batch of pellets are then used:

$$F_{\Delta H}^{E1} = 1 + \sqrt{(1 - F_{\Delta H}^{E1}\text{micro})^2 + (1 - F_{\Delta H}^{E1}\text{macro})^2}$$

$$F_{\Delta H}^{E1}\text{micro} = 1 + \frac{1.645}{1.96}\sqrt{\sum_i \alpha_i^2 \frac{TL_i^2}{\mu_i^2}}$$

$$F_{\Delta H}^{E1}\text{macro} = 1 + \frac{1.645}{1.96}\sqrt{\sum_i \theta_i^2 \frac{TL_i^2}{\mu_i^2}}$$

This calculation is identical to that consisting in calculating an individual technological factor for each fabrication parameter and then in accumulating them to obtain the overall $F_{\Delta H}^{E1}$:

$$F_{\Delta H}^{E1}(i) = 1 + \frac{1.645}{1.96}\sqrt{\sum_i \alpha_i^2 \frac{TL_i^2}{\mu_i^2} + \sum_i \theta_i^2 \frac{TL_i^2}{\mu_i^2}}$$

The overall technological uncertainty factor $F_{\Delta H}^{E1}$ is thus:

$$F_{\Delta H}^{E1} = 1 + \sqrt{\sum_i (1 - F_{\Delta H}^{E1}(i))^2}$$

It should be observed that for $F_{\Delta H}^{E1}$ no account is therefore taken of the individual or microscopic contribution, but only of a contribution that is collective or macroscopic.

As a result:

$$F_{\Delta H}^{E1} \leq F_Q^E$$

Sensitivity coefficients $\alpha_i$ and $\theta_i$ are obtained by calculations performed on a pattern or "cluster" (in the mathematical sense) for the microscopic aspect with the help of the generalized conventional theory of perturbations and by calculations modeling the entire core for the macroscopic aspect, as described below.

Determining Microscopic Sensitivity Coefficients

The method of determining microscopic sensitivity coefficients is analogous to that described in the above-mentioned thesis of Mr. Willermoz.

The method is based on a first-order Taylor development of the powers P of the rods (or point powers) as a function of the fabrication parameters $F_i$.

The underlying assumption is the possibility of linearizing around the nominal values $F_{i0}$ and of considering that the impact on the final result (the point power P) of the variation of a plurality of input variables (the fabrication parameters $F_i$) is equal to the sum of the impacts of each of the variables taken separately.

To the first order, it is thus possible to obtain the impact of microscopic variations of the fabrication parameters on the power variation $\delta P/P_0$ of a rod by the sensitivity coefficients $\alpha_i$ defined as follows:

$$\alpha_i = \frac{\left.\frac{\partial P}{P_o}\right|_{micro}}{\left.\frac{\partial F_i}{F_{io}}\right|_{micro}}$$

It is chosen to introduce these variations on the hot rod, in penalizing manner in compliance with safety criteria, with the other rods of the assembly containing the hot rod remaining nominal. Thereafter, the impact of these perturbations are calculated on the power of the hot rod.

Sensitivity calculations are performed in a pattern or "cluster" in an infinite medium with the help of a calculation code.

Analysis of the nominal neutron flux $\phi$ should reveal three terms: the flux calculated over the assembly in an infinite medium (microscopic flux $\Psi$), the flux calculated over the core, the assemblies being made uniform (macroscopic flux U), and an interface term ($\chi$) that is present above all in mixed fuel management, in particular with a MOX fuel. Consideration is then given to the multiplicative relationship $\phi = U\chi\Psi$. It is shown that the interface term, needed for splitting up the nominal calculation remains sufficiently insensitive to variations in fuel characteristics, thereby enabling analysis to be limited to:

$$\frac{\delta\Phi}{\Phi} = \frac{\delta U}{U} + \frac{\delta\psi}{\psi}$$

The term ($\delta U/U$) is obtained by considering homogenized assemblies. It is therefore negligible compared with microscopic variations (from rod to rod), since homogenizing the assemblies smoothes out variations.

There therefore remains the term due to the flux calculated over the hot rod assembly considered in an infinite medium.

In reality, an assembly in an infinite medium corresponds to a single assembly with zero flow conditions. The zero flow condition is equivalent to mirror symmetry: the assembly is repeated to infinity. Thus, a rod situated in a corner of the assembly under consideration, were it to be disturbed, would be surrounded by three disturbed rods in the virtual assemblies, even though the model would require those three rods to be remain nominal. To calculate the disturbance of a rod over the assembly in an infinite medium, the model is redefined by moving the axes of symmetry further away, i.e. by using a pattern or "cluster", while nevertheless retaining a reasonable dimension therefor.

Figure 4:
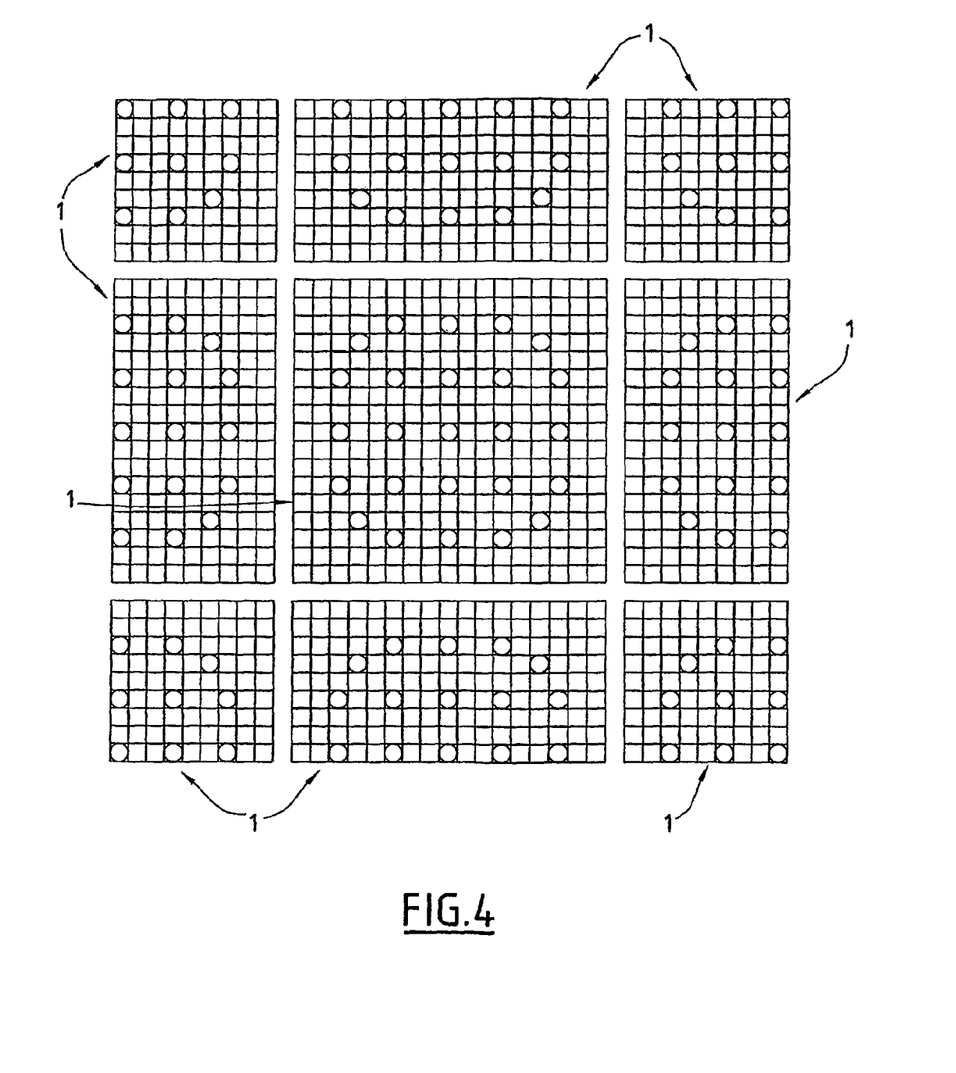
FIG. 4 is a diagrammatic plan view showing the pattern used for calculating microscopic sensitivity coefficients for implementing a determination method of the invention.

The selected pattern thus comprises a complete assembly 1 surrounded by four assembly halves and four assembly quarters. This pattern is shown in FIG. 4. The central assembly 1 is the assembly containing the hot rod.

The composition of the assemblies 1 of the pattern is representative of the fuel management under study, e.g. with a central MOX assembly surrounded by half and quarter ENU assemblies when studying a MOX fuel.

It is recalled that the idea is to calculate the sensitivity coefficients $\alpha_i$ relating to the microscopic variations of the following fabrication parameters $F_i$:
- the pellet diameter D;
- the volume fraction $F_v$;
- the geometrical density Dg;
- the isotope composition CI (for MOX);
- the gadolinium content t (for MOX and gadolinium-containing ENU);
- the enrichment $e_5$ (for ENU), the enrichments $e_4$, $e_5$, and $e_6$ (for ERU); and the enrichment es of the uranium support (for MOX and gadolinium-containing ENU).

The method of calculating the sensitivity coefficients is based on separating neutron calculations into two portions: calculating neutron constants (macroscopic cross-sections) by transport calculation, and calculating the set of parameters for the core in diffusion. This split comes from approximating the transport equation as a diffusion equation.

The method is thus functionally split into two or three portions.

In this functional analysis in two portions, the fabrication parameters are varied without passing via the isotope concentrations. This produces directly the sensitivity coefficients relating the relative power variation of the hot point $\delta P/P_0$ to the relative variations in the fabrication parameters $\delta F_i/F_{i0}$.

The functional split into two portions can be shown diagrammatically as follows:

This functional split into two portions is used for the pellet diameter D. It can be used for all of the other parameters under study, with the exception of the isotope composition CI and the enrichment es of the uranium support for MOX.

The functional split into three portions can be shown diagrammatically as follows:

At this point the isotope concentrations are varied, initially to obtain sensitivity coefficients relating the relative power variation of the $\delta P/P_0$ of the hot rod to relative variations $\delta n_j/n_{j0}$ in isotope concentration. These are deduced from the fabrication parameter variations $\delta F_i/F_{i0}$ (except for the pellet diameter D) using a simple analytic formula given below, and thereafter the sensitivity coefficients obtained that relate $\delta P/P_0$ to each $\delta F_i/F_{i0}$ for $F_i \epsilon [F_v, D_g, CI, t, e_4, e_5, e_6, e_s]$.

This functional split into three portions is used for the isotope composition CI and for the uranium support enrichment es for MOX.

It can be done and is even advisable for all of the other parameters under study with the exception of the pellet diameter D. It thus serves to avoid a corresponding number of sensitivity calculations.

The portion (1b) thus makes use of an analytic formulation given below. The portions (1a) and (2b) calculate the macroscopic cross-sections by a transport code.

The portions (2a) to (3b) use the generalized conventional perturbation theory (GCPT), as explained below.

The looked-for sensitivity coefficients $\alpha_i$ are then obtained.

The methodology that is developed is applied at the beginning of the lifetime of the fuel. It is repeated at operating intervals that are fixed in megawatt days per metric tonne (MWd/t).

Going from Fabrication Parameters to Isotope Concentrations: Analytic Formulation (Portion 1b)

This portion relates to all of the fabrication parameters with the exception of pellet diameter D.

There are then two types of analytic formulation depending on the fuel under study.

MOX or Gadolinium-Containing ENU Fuels

The concentrations of plutonium or of gadolinium isotopes (or of the uranium support) in MOX or gadolinium-containing ENU fuels are obtained using the following analytical formula:

$$n_j = F_v \cdot M_v \cdot t \cdot \frac{C_j}{m_j} \cdot R_{oxy} \cdot N \cdot C_{th}(T)$$

where:
$n_j$: number of atoms per unit volume of the envelope cylinder when hot (without any recesses or chamfers, and after thermal expansion);
$F_v$: volume fraction (pellet volume/envelope cylinder volume);
$M_v$: mass per unit volume (oxide mass/pellet volume);
t: plutonium content (mass (Pu+Am)/mass (Pu+Am+U)) or gadolinium content (mass Gd/mass (Gd+U));
$C_j$: proportion of isotope j ($Pu_j$=mass ($Pu_j$)/mass (Pu+Am)) or ($Gd_j$=mass ($Gd_j$)/mass (Gd)) or ($U_j$)/mass ($U_j$)/mass (U));
$m_j$: atomic mass of isotope j;
$R_{oxy}$: oxide ratio (mass of metal/mass of oxide);
N: constant associated with Avogadro number (=0.6022094 nuclei per cubic angstrom ($Å^3$));
$C_{th}(T)$: thermal expansion coefficient (of the pellet) of temperature T.

The mass per unit volume $M_v$ is equal to the product of the geometrical density $D_g$ multiplied by the theoretical density $\rho_{th}$ of the fuel.

The theoretical density $\rho_{th}$ of the fuel is the function of the content t, but variations in $\delta\rho_{th}/\rho_{th}$ are negligible compared with variations in $\delta t/t_0$.

The variations $\delta M_v/M_{v0}$ are thus equal to the variations $\delta D_g/D_{g0}$.

The values $m_j$ and N are constants and therefore do not vary with fabrication parameter.

The parameters $C_{th}(T)$ and $R_{oxy}$ are a priori functions of the operating point of the reactor under study and of the fabrication parameters $F_i$ for $F_i \epsilon [F_v, D_g, CI, t, es]$, but the variations therein can readily be ignored compared with the variations $\delta F_i/F_{i0}$.

The relative isotope concentration variations $\delta n_j/n_{j0}$ are thus obtained from the fabrication parameter variations $\delta F_i/F_{i0}$ with $F_i \epsilon [F_v, D_g, CI, t, es]$.

With ENU and ERU Fuels

The concentrations of uranium isotopes in ENU and ERU fuels are obtained using the following analytical formula:

$$n_j = F_v \cdot M_v \cdot \frac{C_j}{m_j} \cdot R_{oxy} \cdot N \cdot C_{th}(T)$$

with:
$n_j$: number of atoms per unit volume of the envelope cylinder when hot (without recess nor chamfers after thermal expansion);
$F_v$: volume fraction (pellet volume/envelope cylinder volume);
$M_v$: mass per unit volume (oxide mass/pellet volume);
$C_j$: proportion of isotope j ($U_j$=mass ($U_j$)/mass (U));
$m_j$: atomic mass of isotope j;

$R_{oxy}$: oxide ratio (metal mass/oxide mass);

N: constant associated with Avogadro's number;

$C_{th}(T)$: thermal expansion coefficient (of the pellet) at temperature T.

As above, relative isotope concentration variations $\delta n_j/n_{j0}$ are thus obtained from fabrication parameters $\delta F_i/F_{i0}$ with $F_i \in [F_v, D_g, e_4, e_5, e_5]$.

Passing from Fabrication Parameters or Isotope Concentrations to Cross-Sections (Portions 1a and 2b)

If the option is selected that is the least expensive in terms of the amount of calculation, which is the recommended method, the macroscopic cross-section variations are determined with the help of a transport code by calculating the impact solely:

of a relative variation of about +10% in the isotope concentrations $n_j$ for reconstructing sensitivity coefficients relating to the parameters $F_i \in [F_v, D_g, CI, t, e_4, e_5, e_6, es]$; and of relative variations of about +1% in the pellet diameter D.

Otherwise, macroscopic cross-section variations are determined with the help of a transport code by calculating the impact of each of the following variations:

relative variation of about +10% in the isotope concentrations isotopes $n_j$ for reconstructing sensitivity coefficients relating to CI and to es for MOX only;

relative variation of about +1% in pellet diameter D;

relative variation of about +10% in the parameters $F_i \in [t, e_4, e_5, e_6, es]$ (except es for MOX);

relative variation of about +1% to about +1.5% in the volume fraction $F_v$; and relative variation of about +1% to about +1.5% in the geometrical density $D_g$.

These values can be modulated as a function of the nuclear fuel under study in order to conserve variation that presents a direction suitable for convergence of the code used.

Going from Cross-Sections to Hot Rod Power: GCPT (Portions 2a and 3b)

The relative variation in the power of the hot rod is obtained to the first order by summing two terms:

the direct portion that depends explicitly on the macroscopic cross-section variations; and the spectral portion that depends on the flux variation as evaluated by calculating the importance function.

The direct portion is determined by the product of the power cross-section variation multiplied by flux:

$$\frac{\left\langle \delta \kappa \sum_f, \Phi \right\rangle_{rod}}{\left\langle \kappa \sum_f, \Phi \right\rangle_{rod}} - \frac{\left\langle \delta \kappa \sum_f, \Phi \right\rangle_{pattern}}{\left\langle \kappa \sum_f, \Phi \right\rangle_{pattern}}$$

The spectral portion is conventionally obtained by the product of the important function $\Gamma$ with perturbation multiplied by flux:

$$-\left\langle \Gamma, \left(\delta A - \frac{\delta F}{k}\right) \Phi \right\rangle_{pattern}$$

The equation to be solved for calculating for the important function $\Gamma$ is in the form of Boltzmann's diffusion equation with a source term S:

$$\left(A - \frac{F}{k}\right) * \Gamma = S = \frac{\kappa \sum_{f_{rod}}}{\left\langle \kappa \sum_f, \Phi \right\rangle_{rod}} - \frac{\kappa \sum_{f_{pattern}}}{\left\langle \kappa \sum_f, \Phi \right\rangle_{pattern}}$$

where A and F are the absorption and diffusion production operators.

The relative variation of the power of the hot rod is then expressed as follows:

$$\frac{\delta P}{P_0} = \frac{\left\langle \delta \kappa \sum_f, \Phi \right\rangle_{rod}}{\left\langle \kappa \sum_f, \Phi \right\rangle_{rod}} - \frac{\left\langle \delta \kappa \sum_f, \Phi \right\rangle_{pattern}}{\left\langle \kappa \sum_f, \Phi \right\rangle_{pattern}} - \left\langle \Gamma, \left(\delta A - \frac{\delta F}{k}\right) \Phi \right\rangle_{pattern}$$

Obtaining Sensitivity Coefficients

For $F_i \in [D, F_v, D_g, CI, t, e_4, e_5, e_6, es]$:

$$\frac{\delta P}{P_0} = \sum_j \gamma_j \frac{\delta n_j}{n_{j0}} + \alpha_D \frac{\delta D}{D_0} = \sum_i \alpha_i \frac{\delta F_i}{F_{i0}}$$

In the method, use is made of isotope concentrations $n_j$ for $F_i \in [F_v, D_g, CI, t, e_4, e_5, e_6, es]$. The sensitivity coefficients $\gamma_j$ are then calculated relating the relative variations of isotope concentrations to the relative variation in the power of the hot point:

$$\gamma_j = \frac{\partial \frac{P}{P_0}}{\frac{\partial n_j}{n_{j0}}} = \frac{\frac{\left\langle \delta \kappa \sum_f, \Phi \right\rangle_{rod}}{\left\langle \kappa \sum_f, \Phi \right\rangle_{rod}} - \frac{\left\langle \delta \kappa \sum_f, \Phi \right\rangle_{pattern}}{\left\langle \kappa \sum_f, \Phi \right\rangle_{pattern}} - \left\langle \Gamma, \left(\delta A - \frac{\delta F}{k}\right) \Phi \right\rangle_{pattern}}{\frac{\partial n_j}{n_{j0}}}$$

Knowing $\delta n_j/n_{j0}$, which is a function of $\delta F_i/F_{i0}$, the looked-for sensitivity coefficients $\alpha_i$ are deduced for $F_i \in [F_v, D_g, CI, t, e_4, e_5, e_5, es]$ for each type of fuel.

For pellet diameter D, the sensitivity coefficient $\alpha_D$ is calculated that directly relates relative variation in pellet diameter to relative variation in the power of the hot point:

$$\alpha_D = \frac{\partial \frac{P}{P_0}}{\frac{\partial D}{D_0}} = \frac{\frac{\left\langle \delta \kappa \sum_f, \Phi \right\rangle_{rod}}{\left\langle \kappa \sum_f, \Phi \right\rangle_{rod}} - \frac{\left\langle \delta \kappa \sum_f, \Phi \right\rangle_{pattern}}{\left\langle \kappa \sum_f, \Phi \right\rangle_{pattern}} - \left\langle \Gamma, \left(\delta A - \frac{\delta F}{k}\right) \Phi \right\rangle_{pattern}}{\frac{\partial D}{D_0}}$$

As the fuel burns up, the concentrations of the heavy isotopes vary, as fission products are created, thereby modifying the neutron spectrum. The problem is then to determine how the impact of a perturbation on the "fresh" fuel varies over the course of irradiation.

To do this, the methodology remains unchanged. Only the parameters that are taken into account in determining the sensitivity coefficients change as a function of burnup, i.e.:

the variations in the macroscopic cross-sections calculated for each degree of burnup on the basis of the impact of isotope concentration variations and/or fabrication parameter variations at 0 MWd/t; and the importance function F that is calculated for each degree of burnup.

It is then possible to associate the relative variations in the fabrication parameters at 0 MWd/t directly with the relative variation in the power of the hot point for a degree of burnup EU by using the microscopic sensitivity coefficient $\alpha_i|BU$:

$$\left.\frac{\delta P}{P_0}\right|_{BU} = \sum_i \alpha_i|_{BU} \left.\frac{\delta F_i}{F_{i0}}\right|_{BU=0}$$

These coefficients can be calculated for any degree of burnup.

In practical manner, they are calculated only for burnup of 150 MWd/t since it is at that degree of burnup that the technological uncertainty factors are found to be at their maximum.

Where necessary, the coefficients may be determined for a plurality of degrees of burnup up to about 50,000 MWd/t or 60,000 MWd/t.

Determining Macroscopic Sensitivity Coefficients

As for the microscopic aspect, the method implemented is based on a first-order Taylor development of the point powers P of the rods, as a function of fabrication parameters $F_i$.

To the first order, it is thus possible to obtain the impact of macroscopic variations in the fabrication parameters on the power variation $\delta P/P_0$ of a rod by using sensitivity coefficients $\theta_i$, defined as follows:

$$\theta_i = \frac{\left.\frac{\partial P}{P_0}\right|_{macro}}{\left.\frac{\partial F_i}{F_{i0}}\right|_{macro}}$$

Since the macroscopic variations of the fabrication parameters considered herein affect at least one assembly, it is chosen to introduce these variations to an entire assembly in the core and to only one such assembly, with this situation being considered as being realistic and sufficiently penalizing. Thereafter, the impact of these perturbations is calculated on the power of the hot point.

The particular core assembly to be perturbed is chosen as a function of the reference fuel management under consideration. Generically, the reference management used is the management planning that was used as a basis for developing the fuel assembly under study. In such management, it is the position of the assembly 1 containing the hot rod that is studied.

Three Situations Arise:

if the hot rod is contained in a new assembly having the type of nuclear fuel that is under study, then the macroscopic variations of the fabrication parameters are applied to that assembly. The impact of these variations on the power of the hot rod are then studied for one cycle only, since experience shows that the values of the sensitivity coefficients decrease over time;

if the hot rod is contained in a new or spent assembly that does not have the same type of nuclear fuel as the fuel under study, then the variations are applied to that one of the new assemblies that have the type of nuclear fuel that is under study and for which the radial power peak factor Fxy is the greatest. As before, the impact of these variations on the power of the hot rod is then studied over the course of one cycle only; and if the hot rod is contained in a spent assembly that has the type of nuclear fuel that is under study, then these variations are applied initially to said spent assembly for the cycle at which it is loaded into the core, and subsequently to that one of the new assemblies that have the desired type of fuel and for which Fxy is the highest. It is then necessary to verify that the sensitivity coefficients obtained from the spent assembly are smaller than those obtained from the new assembly, since, in principle, the values of sensitivity coefficients diminish over time.

The method of calculating the sensitivity coefficients $\theta_i$ is similar to that described for the microscopic aspect, with the GCPT calculation over a pattern being replaced by model calculations over the entire core using a calculation sequence that includes a transport code.

For reasons of accuracy in the calculations modeling the core, the following are selected:

the fabrication parameters $F_i \in [D, D_g, CI, t, e_4, e_5, e_6]$ are split into two portions, with the coefficient relating to $F_v$ being taken as being equal to that calculated for $D_g$; and the content correction parameters CI and es of a MOX fuel are split into three portions.

The portion (1b) relies on an analytic formulation. It is identical to that used for the microscopic aspect.

The portions (1a) and (2b) calculate macroscopic cross-sections by the transport code.

The portions (2a) and (3b) are performed by direct calculations modeling the entire core.

The looked-for sensitivity coefficients $\theta_i$ are then obtained. The methodology developed at the beginning of the lifetime of the nuclear fuel is reproduced at time intervals that are fixed (in MWd/t).

Going from Fabrication Parameters or Isotope Concentrations to Cross-Sections (Portions 1a and 2b)

In order to have a meaningful difference in the identified power deviations, thereby avoiding inaccuracies associated with the modeling calculations, it is appropriate to select input values for variations in variables that are of sufficient magnitude for some of the parameters, while taking care to remain within the assumption of linearity.

Variations in the macroscopic cross-sections are then determined with the help of the transport code by calculating the impact:

of a relative variation, generally of +10%, in the isotope concentrations $n_j$ for reconstructing coefficients relating to CI and to es when MOX is used, or even more (up to +60%) for certain isotopes at low concentrations;

of a relative variation of about +1.5% in the pellet diameter D;

of a relative variation of about +5% in the geometric density $D_g$;

of a relative variation of about +10% in the parameters $F_i \in [t, e_5]$; and of a relative variation of about +60% in the enrichment $e_4$ and of +20% in the enrichment $e_6$ when using ERU.

The coefficient relating to $F_v$ is taken as being equal to that calculated for $D_g$. No calculation is thus performed for $F_v$.

These values can be modeled as a function of the nuclear fuel under study so as to conserve variation that is in a direction appropriate for convergence of the code used.

Going from Cross-Sections to the Power of the Hot Point (Portions 2a and 3b)

At the end of the above-described step, the following are available:

- a library of reference macroscopic sections correspond to the nominal characteristics of the fuel under study;
- as many "perturbed" macroscopic section libraries as there are isotopes $CI_S$ for the parameters CI and es of MOX; and
- a library of "perturbed" macroscopic sections for each fabrication parameter $F_i \in [D, D_g, t, e_4, e_5, e_6]$.

A first direct calculation modeling the entire core from the reference library gives the power of the reference hot point $P_0^{ref}$ (sometimes written simply as $P_0$).

For each of the fabrication parameters $F_i \in [D, D_g, CI_j, t, e_4, e_5, e_6]$, a calculation modeling the entire core on the basis of the corresponding perturbed section library gives the power of the perturbed hot point $P^{pert}(F_i)$.

This obtains the relative variation in the power of the hot point $\delta P/P_0(F_i)$ for each fabrication parameter $F_i \in [D, D_g, CI_j, t, e_4, e_5, e_6]$:

$$\frac{\delta P}{P_0}(F_i) = \frac{P^{pert}(F_i) - P_0^{ref}}{P_0^{ref}}$$

Obtaining Sensitivity Coefficients

The following apply:

$$\frac{\delta P}{P_0} = \sum_j \mu_j \frac{\delta n_j}{n_{j0}} + \sum_i \theta_i \frac{\delta F_i}{F_{i0}}$$

For $F_i \in [CI, es]$ when using a MOX fuel, use is made of the isotope concentrations $n_j$. The sensitivity coefficients $\mu_j$ are then calculated that relate relative variations in isotope concentrations to the relative variation in the power of the hot point:

$$\mu_j = \frac{\frac{\partial P}{P_0}}{\frac{\partial n_j}{n_{j0}}} = \frac{\frac{P^{pert}(CI_j) - P_0^{ref}}{P_0^{ref}}}{\frac{\partial n_j}{n_{j0}}}$$

Knowing $\delta n_j/n_{j0}$ which is a function of $\delta F_i/F_{i0}$, the looked-for sensitivity coefficients $\theta_i$ for the parameters CI and es of MOX can be deduced therefrom.

For the other parameters $F_i \in [D, D_g, t, e_4, e_5, e_6]$, the sensitivity coefficients $\theta_i$ that relate the relative variations of the fabrication parameters $F_i$ to the relative variation in the power of the hot point are calculated directly, with the coefficient relating to $F_v$ being taken as being equal to the coefficient calculated for $D_g$:

$$\theta_i = \frac{\frac{\partial P}{P_0}}{\frac{\partial F_i}{F_{i0}}} = \frac{\frac{P^{pert}(F_i) - P_0^{ref}}{P_0^{ref}}}{\frac{\partial F_i}{F_{i0}}}$$

In the same manner as for the microscopic aspect, it can be useful to determine how the impact of a perturbation on "fresh" fuel varies over the course of irradiation. The methodology remains unchanged.

It is then possible to associate relative variations in the fabrication parameters at 0 MWd/t directly with the relative variation in the power of the hot point at a degree of burnup BU by means of the macroscopic sensitivity coefficient $\theta_{i|BU}$:

$$\left.\frac{\delta P}{P_0}\right|_{BU} = \sum_i \theta_i|_{BU} \left.\frac{\delta F_i}{F_{i0}}\right|_{BU=0}$$

These coefficients can be calculated for any degree of burnup.

Practically, they are calculated solely for a burnup of 150 MWd/t since it is at that degree of burnup that the technological uncertainty factors are at their maximum.

Where necessary, the coefficients may be determined for a plurality of degrees of burnup, generally over one irradiation cycle.

When these coefficients are known, it is possible to determine the technological uncertainty factors.

To summarize, if the individual tolerances of pellets and the collective tolerances of a batch of pellets associated with any one fabrication parameter $F_i$ are written respectively $T_i$ and $TL_i$, then the technological uncertainty factors $F_Q^E$ and $F_{\Delta H}^{E1}$ can be determined as follows:

for an ENU fuel:

$$F_Q^E = 1 + \frac{1.645}{1.96}\sqrt{\sum_{i \in [D, Fv, Dg, e]}\left(\alpha_i^2 \frac{T_i^2}{\mu_i^2} + \theta_i^2 \frac{TL_i^2}{\mu_i^2}\right)} \quad (1)$$

$$F_{\Delta H}^{E1} = 1 + \frac{1.645}{1.96}\sqrt{\sum_{i \in [D, Fv, Dg, e]}\left(\alpha_i^2 \frac{TL_i^2}{\mu_i^2} + \theta_i^2 \frac{TL_i^2}{\mu_i^2}\right)} \quad (2)$$

for an ENU fuel with gadolinium-containing rods:

$$F_Q^E = 1 + \frac{1.645}{1.96}\sqrt{\sum_{i \in [D, Fv, Dg, es, t]}\left(\alpha_i^2 \frac{T_i^2}{\mu_i^2} + \theta_i^2 \frac{TL_i^2}{\mu_i^2}\right)} \quad (3)$$

$$F_{\Delta H}^{E1} = 1 + \frac{1.645}{1.96}\sqrt{\sum_{i \in [D, Fv, Dg, es, t]}\left(\alpha_i^2 \frac{TL_i^2}{\mu_i^2} + \theta_i^2 \frac{TL_i^2}{\mu_i^2}\right)} \quad (4)$$

for an ERU fuel:

$$F_Q^E = 1 + \frac{1.645}{1.96}\sqrt{\sum_{i \in [D, Fv, Dg, CI]}\left(\alpha_i^2 \frac{T_i^2}{\mu_i^2} + \theta_i^2 \frac{TL_i^2}{\mu_i^2}\right)} \quad (5)$$

$$F_{\Delta H}^{E1} = 1 + \frac{1.645}{1.96}\sqrt{\sum_{i \in [D, Fv, Dg, CI]}\left(\alpha_i^2 \frac{TL_i^2}{\mu_i^2} + \theta_i^2 \frac{TL_i^2}{\mu_i^2}\right)} \quad (6)$$

for a MOX fuel:

$$F_{\Delta H}^{E1} = 1 + \frac{1.645}{1.96}\sqrt{\sum_{i \in [D, Fv, Dg, t, CI]}\left(\alpha_i^2 \frac{TL_i^2}{\mu_i^2} + \theta_i^2 \frac{TL_i^2}{\mu_i^2}\right)} \quad (7)$$

-continued $$F_Q^E = 1 + \frac{1.645}{1.96} \sqrt{\sum_{i \in [D, Fv, Dg, t, Cl]} \left( \alpha_i^2 \frac{T_i^2}{\mu_i^2} + \theta_i^2 \frac{TL_i^2}{\mu_i^2} \right)} \quad (8)$$

Furthermore, as explained above, it is possible to calculate the macroscopic sensitivity coefficients $\alpha_i$ and the microscopic sensitivity coefficients $\theta_i$ for each type of fuel.

Thus, starting firstly from calculated sensitivity coefficient values and secondly from above formulae (1) to (8), it is possible to determine the technological uncertainty factors for various types of nuclear fuel.

This method of determining technological uncertainty factors can be used, for example:
- to dimension the fabrication tolerances of nuclear fuel pellets that are to be fabricated;
- to issue advice during fabrication concerning the possibility of using fabricated nuclear fuel pellets in the event that an abnormally occurred during fabrication; and
- to evaluate the technological uncertainty factors for nuclear fuel pellets at the end of fabrication.

In the first of those circumstances, the values for $F_Q^E$ and $F_{\Delta H}^{E1}$ are known and depend on the reactor in which the nuclear fuel that is to be fabricated is going to be loaded. As a function of the type of fuel to be fabricated, values are also known for the pertinent sensitivity coefficients $\alpha_i$ and $\theta_i$. The nominal values $F_{i0}$ are used as means $\mu_i$ for the parameters $F_i$. It is then possible, e.g. iteratively, to determine the individual and collective fabrication tolerances $T_i$ and $TL_i$ for the pertinent fabrication parameters $F_i$.

Thus, values are defined for $T_i$ and $TL_i$ and then, using the above-described method, corresponding values are determined for the technological uncertainty factors.

If these values exceed the authorized limit values, then the values $T_i$ and $TL_i$ are decreased and the values of the technological uncertainty factors are determined again, and so on until the limit values set for the reactor in question are complied with.

$T_i$ corresponds to the individual tolerance that needs to be complied with by each pellet 23, i.e. the real values as measured for $F_i$ must lie within the range $F_{i0} \pm T_i$ for 95% of the pellets. $TL_i$ corresponds to the tolerance that the mean of the measured real values in a batch coming from the same fabrication run must comply with, i.e. for 95% of the batches, the mean of the real values of $F_i$ must lie within the range $F_{i0} \pm TL_i$.

$T_i$ is thus referred to as the individual or microscopic tolerance, and $TL_i$ is referred to as the collective or macroscopic tolerance.

Once these individual and collective tolerances have been determined, they are supplied to the pellet manufacturer who then has constraints available that must be complied with during fabrication.

In order to increase the freedom of the pellet manufacturer, it is also possible to supply the manufacturer with means for calculating technological uncertainty factors locally on the basis of the individual and collective tolerances. Under such circumstances, the manufacturer is provided with no more than the limit values to be complied with for the technological uncertainty factors, and it is the manufacturer who determines the corresponding values for $T_i$ and $TL_i$.

In the second above-mentioned circumstances, if for some fabricated batch one or more of the tolerances $T_i$ and $TL_i$ are not complied with, then the pellet manufacturer gives the real measured values for the parameters $F_i$ of the corresponding batch of pellets. These measurements can be performed only on a statistically representative sample of the fabricated batch.

For each of the parameters $F_i$, instead of using the individual tolerance $T_i$, is in the maximum deviation between the real values as measured in the pellets of the batch and the nominal value $F_{i0}$ that is used in the above formulae (1) to (8). This deviation is referred to as the individual deviation $E_i$.

Instead of using the collective tolerance $TL_i$, account is taken of the mean of the deviations between the real values as measured in the sample taken and the corresponding nominal value. This deviation is referred to as the collective deviation and is written $EL_i$.

For the mean $\mu_i$, use is made of the mean of the values as actually measured for $F_i$.

These parameters $E_i$, $EL_i$ and $\mu_i$ are injected into the calculation formulae (1) to (8), thus making it possible to obtain values for the technological uncertainty factors $F_Q^E$ and $F_{\Delta H}^{E1}$ for the fabricated batch of pellets.

It is then possible to verify whether, in spite of certain fabrication tolerances $T_i$ and $TL_i$ not being complied with, the fabricated pellets can be used for obtaining technological uncertainty factor values that remain below the limit values for the reactor under consideration.

Compensations between the various parameters $F_i$ can occur, thus making it possible to comply with acceptable technological uncertainty factor values, in spite of some particular tolerances being exceeded on a fabrication parameter.

In the third of the above-mentioned circumstances, as in the second circumstance, it is possible to use the means $\mu_i$ and the deviations $E_i$ and $EL_i$ as determined from the real values as measured on the fabricated pellets to confirm compliance with the constraints expressed in terms of limit values for the technological uncertainty factors.

The method of determining the above-mentioned uncertainty factors is found to be more accurate than that used in the state of the art. The determining factor turns out to be taking account of macroscopic variation.

For equal limiting values for the technological uncertainty factors, it has been found that this method makes it possible, in production, to reduce the dispersion in the real values of the fabrication parameters $F_i$ relative to the nominal values $F_{i0}$. It is therefore possible to increase the fabrication tolerances used by pellet manufacturers, while continuing to comply with the same constraints in terms of technological uncertainty factors.

Pellet manufacturers thus gain in flexibility, thereby making it possible to reduce the cost of producing nuclear fuels, for given safety levels.

Similarly, this can make it possible to use nuclear fuels that would previously have been rejected, even though they comply with constraints expressed in terms of limit values for technological uncertainty factors.

Conversely, for given fabrication tolerances, it is possible to reduce the technological uncertainty factor values that are taken into account in managing nuclear reactors, and thus to increase their operational flexibility. This also makes it possible to achieve savings.

The invention can be implemented using calculations other than those in the example described above. Nevertheless, account should always be taken of a macroscopic aspect for at least one fabrication parameter, as in the example described above for $F_{\Delta H}^{E1}$ or of a microscopic aspect and a macroscopic aspect in combination, as in the above-described example for $F_Q^E$.

In the above-described example, account is taken only of nuclear fuel elements for pressurized light water reactors.

Nevertheless, the invention can also be applied to fabricating fuels for other light water reactors, e.g. boiling water reactors.

Similarly, the invention can be applied to nuclear fuels for other types of reactor, such as high temperature reactors (HTR) for example.

The nuclear fuel elements taken into consideration are therefore not necessarily pellets, but they could be spheres.

What is claimed is:

1. A method of fabricating nuclear fuel elements, the method comprising:
    determining at least one technological uncertainty factor for nuclear fuel elements, using, for at least one fabrication parameter:
        a collective variation in the at least one fabrication parameter about a nominal value within a batch of fabricated elements, and in addition to the collective variation,
        an individual variation in the at least one fabrication parameter about a nominal value for an individual element; and
    fabricating the nuclear fuel elements based on the at least one technological uncertainty factor,
    wherein the technological uncertainty factor is determined for linear power density at a hot point $F_Q^E$.

2. The method as recited in claim 1 wherein the collective variation is multiplied by a macroscopic sensitivity coefficient.

3. The method as recited in claim 2 wherein the individual variation is multiplied by a microscopic sensitivity coefficient.

4. The method as recited in claim 3 wherein the determining at least one technological uncertainty factor for nuclear fuel elements includes determining the technological uncertainty factor for linear power density at the hot point $F_Q^E$ according to a formula of:

$$F_Q^E = 1 + \frac{1.645}{1.96}\sqrt{\sum_i \left(\alpha_i^2 \frac{T_i^2}{\mu_i^2} + \theta_i^2 \frac{TL_i^2}{\mu_i^2}\right)}$$

where $T_i$ and $TL_i$ respectively designate individual and collective variations in a fabrication parameter $F_i$, and $\alpha_i$ and $\theta_i$ respectively designate the microscopic and the macroscopic sensitivity coefficients for the fabrication parameter, and where $\mu_i$ designates a mean for the fabrication parameter $F_i$.

5. The method as recited in claim 1 wherein the collective variation is a collective tolerance, a deviation between a mean of real values for the fabrication parameter within a batch of elements and nominal value being required to comply with the collective tolerance.

6. The method as recited in claim 5 wherein the individual variation is an individual tolerance, a deviation between a real value of the fabrication parameter for an individual element and a nominal value needing to comply with the individual tolerance.

7. A method of fabricating nuclear fuel elements, the method comprising:
    determining at least one technological uncertainty factor for nuclear fuel elements, using, for at least one fabrication parameter:
        a collective variation in the at least one fabrication parameter about a nominal value within a batch of fabricated elements, and in addition to the collective variation,
        an individual variation in the at least one fabrication parameter about a nominal value for an individual element; and
    fabricating the nuclear fuel elements based on the at least one technological uncertainty factor,
    wherein the technological uncertainty factor is determined for a hot channel $F_{\Delta H}^{E1}$.

8. The method as recited in claim 7 wherein the collective variation is multiplied by a macroscopic sensitivity coefficient.

9. The method as recited in claim 8 wherein the individual variation is multiplied by a microscopic sensitivity coefficient.

10. The method as recited in claim 9 wherein the determining at least one technological uncertainty factor for nuclear fuel elements includes determining the technological uncertainty factor for the hot channel $F_{\Delta H}^{E1}$ according to a formula of:

$$F_{\Delta H}^{E1} = 1 + \frac{1.645}{1.96}\sqrt{\sum_i \left(\alpha_i^2 \frac{TL_i^2}{\mu_i^2} + \theta_i^2 \frac{TL_i^2}{\mu_i^2}\right)}$$

where $TL_i$ designates the collective variation in a fabrication parameter $F_i$, where $\alpha_i$ and $\theta_i$ designate respectively the microscopic and the macroscopic sensitivity coefficients in the fabrication parameter, and where $\mu_i$ designates a mean for the fabrication parameter $F_i$.

11. The method as recited in claim 7 wherein the collective variation is a collective tolerance, a deviation between a mean of real values for the fabrication parameter within a batch of elements and nominal value being required to comply with the collective tolerance.

12. The method as recited in claim 11 wherein the individual variation is an individual tolerance, a deviation between a real value of the fabrication parameter for an individual element and a nominal value needing to comply with the individual tolerance.

* * * * *